(12) United States Patent
Kondo et al.

(10) Patent No.: US 6,512,497 B1
(45) Date of Patent: Jan. 28, 2003

(54) IMAGE INFORMATION DISPLAY DEVICE

(75) Inventors: Takashi Kondo, Sakai (JP); Sadafusa Tsuji, Tondabayashi (JP); Hideo Hotomi, Nishinomiya (JP); Katsuyuki Nanba, Sakai (JP); Isao Hayami, Ashiya (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/537,456

(22) Filed: Mar. 27, 2000

(30) Foreign Application Priority Data

Mar. 30, 1999 (JP) .............................. 11-089723

(51) Int. Cl.⁷ ................................................ G09G 5/00
(52) U.S. Cl. ........................................ 345/1.1; 345/901
(58) Field of Search .......................... 345/1.1, 1.2, 2.2, 345/2.3, 3.3, 3.4, 169, 173, 174, 176; 178/78.01–18.07, 18.1, 18.11

(56) References Cited

U.S. PATENT DOCUMENTS

| 5,239,665 A | | 8/1993 | Tsuchiya ..................... 395/800 |
| 5,463,725 A | * | 10/1995 | Henckel et al. ............. 345/473 |
| 5,534,888 A | * | 7/1996 | Lebby et al. ................ 345/672 |
| 5,663,748 A | * | 9/1997 | Huffman et al. ............ 345/173 |
| 5,696,982 A | * | 12/1997 | Tanigawa et al. ........... 345/1.1 |
| 5,847,698 A | * | 12/1998 | Reavey et al. .............. 345/173 |
| 5,881,299 A | * | 3/1999 | Nomura et al. ............. 345/103 |
| 5,909,690 A | * | 6/1999 | Tanigawa et al. ........... 345/839 |
| 6,005,545 A | * | 12/1999 | Nishida et al. ............. 345/173 |
| 6,072,476 A | * | 6/2000 | Harada et al. ............... 345/1.1 |
| 6,313,828 B1 | * | 11/2001 | Chombo ..................... 345/169 |

* cited by examiner

*Primary Examiner*—Vijay Shankar
*Assistant Examiner*—Nitin Patel
(74) *Attorney, Agent, or Firm*—Sidley Austin Brown & Wood LLP

(57) ABSTRACT

An image information display device, such as an electronic book, that displays contents stored in a recording medium on a first screen and a second screen in which liquid crystal is used. The device includes means for paging through image information and means for screen selection. The means for screen selection is used to select a two-screen mode in which the contents are displayed on both the first and second screens or a one-screen mode in which an image is displayed on either of the screens. By selecting the one-screen mode, energy consumption may be reduced.

29 Claims, 12 Drawing Sheets

(A) TWO SCREEN MODE (B) ONE SCREEN MODE

IMAGE INFORMATION DISPLAY DEVICE

This application is based on the application No. 11-089723 filed in Japan, the content of which is hereby incorporated by reference.

BACKGROUND OF THE INVENTION

1. Field of the Invention

The present invention pertains to an image information display device such as an electronic book, and more particularly to an image information display device that reads image data from a recording medium and that displays images, based on read image data, on a display screen or screens comprising liquid crystal or the like.

2. Description of the Related Art

Various types of portable terminals (hereinafter 'electronic books') have been commercialized in recent years that (i) read information comprising images, for example, from a recording medium in which book data is stored, and (ii) display the information on a display screen or screens. If an electronic book is constructed such that two screens may be opened side by side, the information can be read by leafing through the pages in the same manner as one would read a regular book, giving rise to no feeling of discomfort or oddness. However, an electronic book of this-type is generally driven by a battery so that it can be made portable, and as a result the issue is how to drive the device while reducing the amount of power consumed by the display screens that display two-page information. Therefore, the object of the present invention is to provide a two-screen electronic book that can reduce energy consumption.

SUMMARY OF THE INVENTION

In order to attain the object described above, the information display device pertaining to the present invention comprising: a first display to display an image; a second display to display an image; a selector that is adapted to select between at least a first mode of operation and a second mode of operation; and a controller, coupled to the selector, the first display, and the second display, to control a display of images in the first display and the second display in accordance with a selected mode of operation, wherein in the first mode of operation, image information is displayed on one of the first display and the second display, and in the second mode of operation, image information is displayed on both the first display and the second display.

BRIEF DESCRIPTION OF THE DRAWINGS

In the following description, like parts are designated by like reference numbers throughout the several drawings.

DETAILED DESCRIPTION OF THE PREFERRED EMBODIMENTS

The embodiments of the electronic book pertaining to the present invention are explained below with reference to the accompanying drawings.

Figure 1:
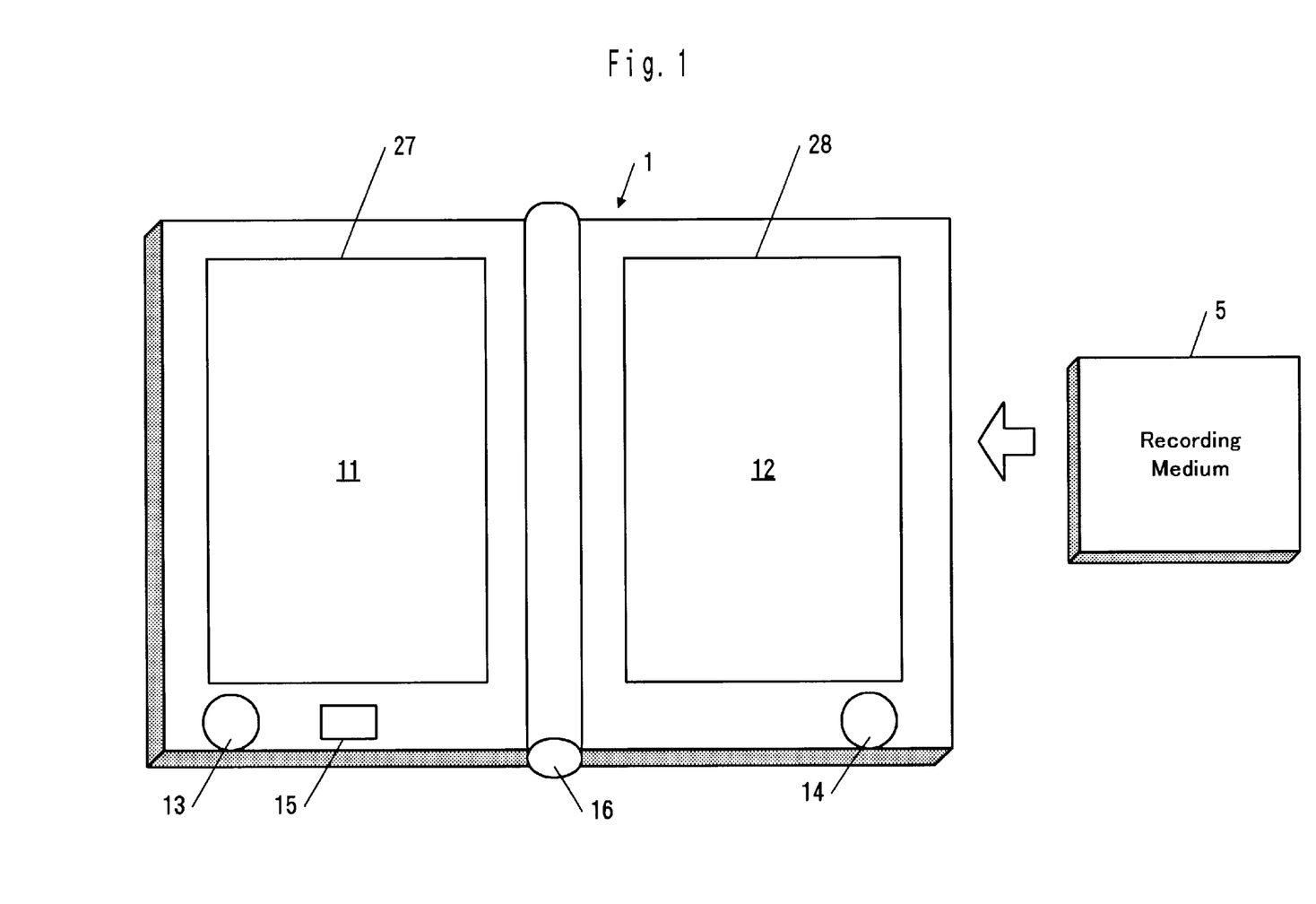
FIG. 1 is a perspective view showing an external view of an electronic book, a first embodiment of the present invention.

FIG. 1 shows the external view of an electronic book 1, a first embodiment of the present invention. The electronic book 1 has a first screen 11 and a second screen 12 that are connected so that they can be opened side by side or closed together, with a support shaft 16 in the center working as a fulcrum. Various information (contents) is displayed on the screens 11 and 12 in the same manner as in regular books and magazines. In the explanations provided below, contents are referred to as image data, which includes character information. The screens 11 and 12 comprise liquid crystal displays that use liquid crystal and are driven using the matrix method. The image data for display is stored in a recording medium 5, for example, such as a CD (compact disk), MD (mini-disk) or MO (magneto-optical) disk. A slot (not shown) in which the recording medium 5 is inserted is formed in this example on the right side surface of the main unit of the electronic book 1.

Page forward buttons 13 and 14 are located below the screens 11 and 12, respectively. A screen selection button 15 is also located below the screen 11. A power switch (not shown) is also located on the electronic book 1.

When the page forward button 13 is pressed, the pages are forwarded to the left (relative to the drawing) and when the page forward button 14 is pressed, the pages are forwarded to the right. If the image data comprises a document formed of characters written horizontally, the pages progress from left to right. Therefore, when the button 14 is pressed, forwarding by one page takes place, while when the button 13 is pressed, page return by one page takes place. If the image data comprises a writing formed of characters written vertically, the pages progress from right to left. Therefore, when the button 13 is pressed, forwarding by one page takes place, while when the button 14 is pressed, page return by one page takes place.

The screen selection button 15 is used to select either a two-screen mode in which an image is displayed on each of the screens 11 and 12, or a one-screen mode in which an image is displayed on only one of the screens 11 and 12. In the first embodiment, the default setting when the power is turned ON specifies the two-screen mode in which an image is displayed on each of the screens 11 and 12. When the screen selection button 15 is pressed in the default state, the one-screen mode in which an image is displayed, for example, on the screen 11 only is selected. The two-screen mode and the one-screen mode are alternately selected each time the screen selection button 15 is pressed.

The power switch is either located on the screen surface of the electronic book 1 in the same manner as the buttons 13, 14 and 15, or may be constructed such that it turns ON and OFF when the electronic book 1 is opened and closed.

Figure 2:
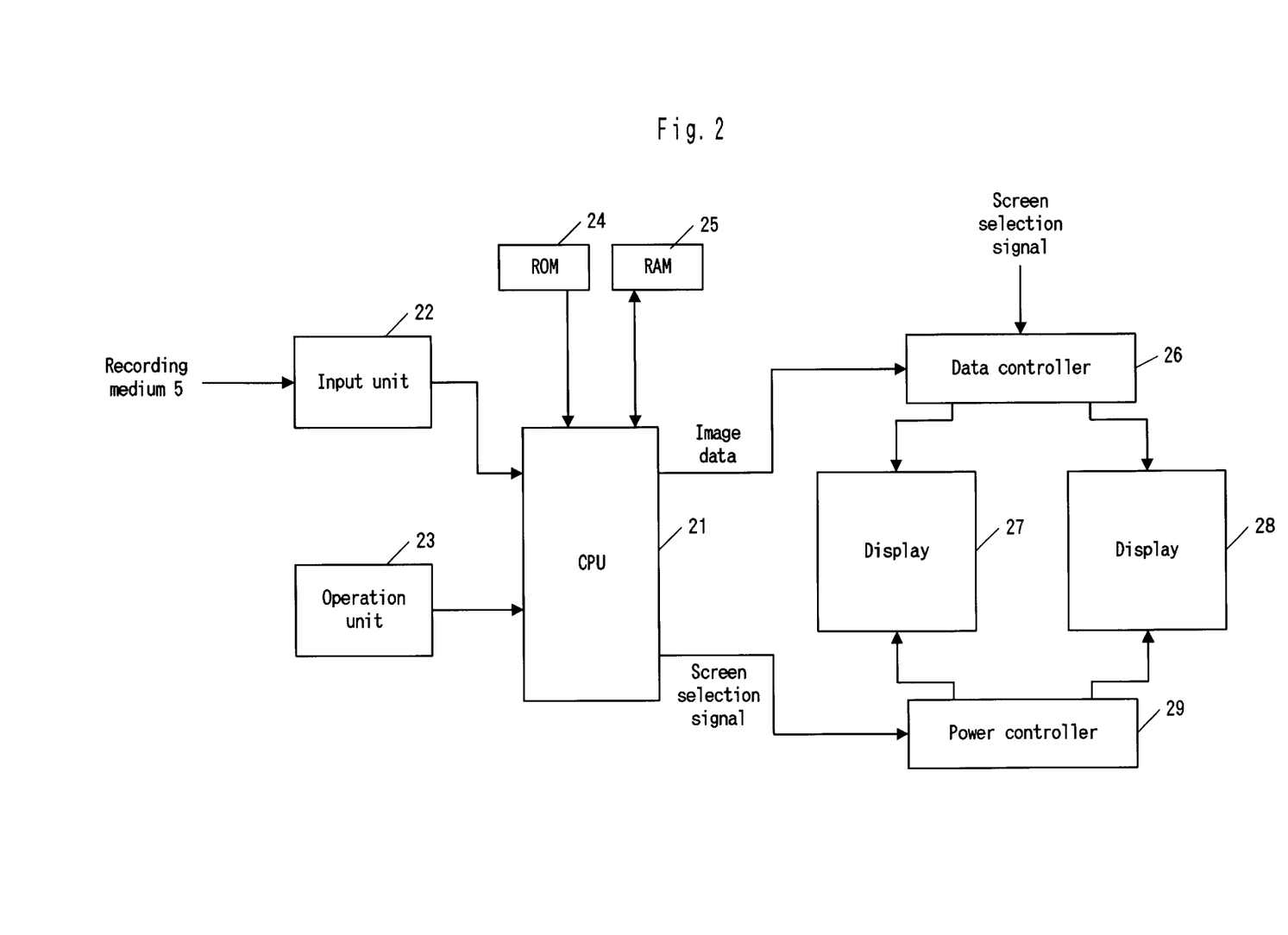
FIG. 2 is a block diagram showing a control circuit of the electronic book.

FIG. 2 shows the entire control circuit of the electronic book 1. This control circuit is constructed around a CPU 21 at the center and has an input unit 22 for inputting image data from a recording medium 5, an operation unit 23 including the power switch, the button 13, etc., a ROM 24 that stores an operation program, a RAM 25 that mainly stores the image data input from the input unit 22, a data controller 26, and a power supply controller 29.

The data controller 26 transfers image data to the liquid crystal displays 27 and 28 comprising the screens 11 and 12, respectively, and controls the display of visible images. Power to the electronic book 1 is supplied from the power controller 29 that includes a battery. The CPU 21 sends the power controller 29 a screen selection signal that indicates whether both the liquid crystal displays 27 and 28 are to be driven or only the display 27 comprising the first screen 11 is to be driven. The power controller 29 controls the power supply such that power is supplied to the displays 27 and 28 or the display 27 depending on the designation based on the screen selection signal.

Figure 3:
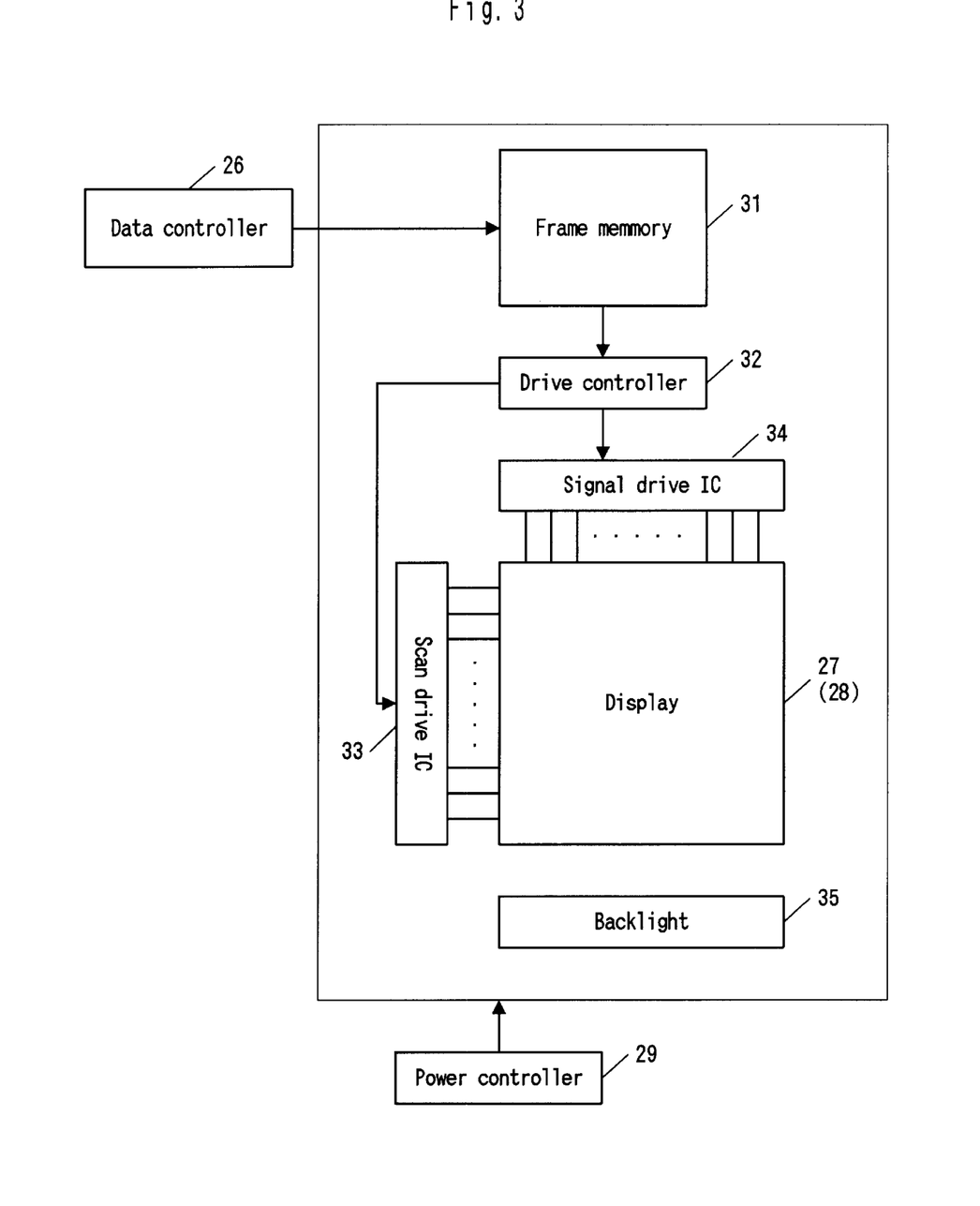
FIG. 3 is a block diagram showing a drive circuit for the liquid crystal display mounted in the electronic book.

FIG. 3 shows the drive circuit for the liquid crystal display 27 or 28. This drive circuit comprises a frame memory 31, a drive controller 32, a scanning drive IC 33, a signal drive IC 34, and a backlight 35. The liquid crystal displays 27 and 28 are driven in a matrix fashion, with the points of intersection between the scanning electrodes, which extend horizontally in FIG. 3, and the signal electrodes, which extend vertically, functioning as pixels.

The frame memory 31 saves the image data for each pixel transferred from the data controller 26 in the corresponding address. The drive controller 32 comprises a shift register, etc. The drive controller 32 divides the image data sent from the frame memory 31 into a scanning signal and image signal data for each scanning line and transfers them to the drive ICs 33 and 34 in a synchronized fashion. The liquid crystal displays 27 and 28 are driven by scanning line by a voltage impressed from the electrodes driven by the drive ICs 33 and 34 to display an image.

The backlight 35 illuminates the liquid crystal displays 27 and 28 from behind. Where reflective liquid crystal is used for the displays 27 and 28, the backlight 35 should be constructed such that it illuminates the displays 27 and 28 from the front.

When the power is turned OFF by the power controller 29, power supply to the electrodes and the backlight 35 is stopped, such that no power can be consumed. In the first embodiment, as described below, if the one-screen mode is selected, the power controller 29 turns OFF power supply to all components related to the second display 28, so that power consumption is reduced to the extent possible. If the construction is such that power is turned OFF to the backlight 35 only, a substantial power conservation effect may still be obtained.

The control sequence performed by the CPU 21 will now be explained with reference to the flow charts in FIGS. 4 through 6.

Figure 4:
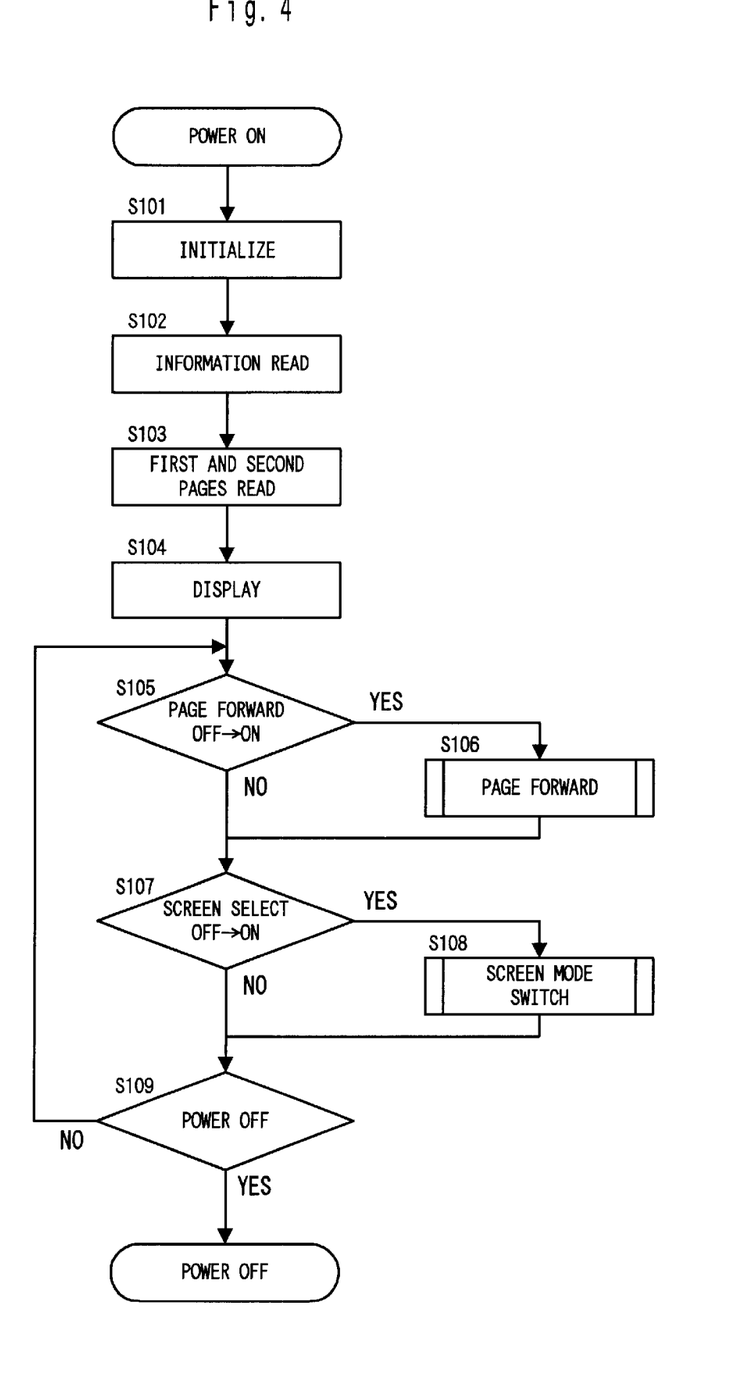
FIG. 4 is a flow chart showing a main routine for the first embodiment.

FIG. 4 shows the main routine performed by the CPU 21. When power is turned ON, the RAM 25 and various other components are initialized in step S101. The two-screen mode is set as default for the screen mode. The information stored in the recording medium 5 is then read by the input unit 22 in step S102. This information includes information regarding whether the image data comprises vertically or horizontally written characters as well as the direction of the page forwarding.

In step S103, the image data for the first and second pages of the recording medium 5 is read, and the image data is displayed on the screens 11 and 12 in step S104. Where the image comprises horizontally written characters, the odd-numbered page is displayed on the first screen 11. Where the image comprises vertically written characters, the odd-numbered page is displayed on the second screen 12. When page forwarding is instructed by means of the page forward button 13 or 14 in step S105, the pages are forwarded forward or backward in step S106. In other words, the image data for the next page(s) or the previous page(s) is read out and displayed on the screens 11 and 12. The direction of page forwarding for vertically written images are opposite from that for horizontally written images.

Where screen selection is instructed by means of the screen selection button 15 in step S107, the screen mode is switched in step S108. The screen mode switching process in this step S108 and the page forwarding process in step S106 are explained in detail below. When an instruction to turn the power OFF is issued in step S109, the power is turned OFF, whereupon all control processes come to an end.

Figure 5:
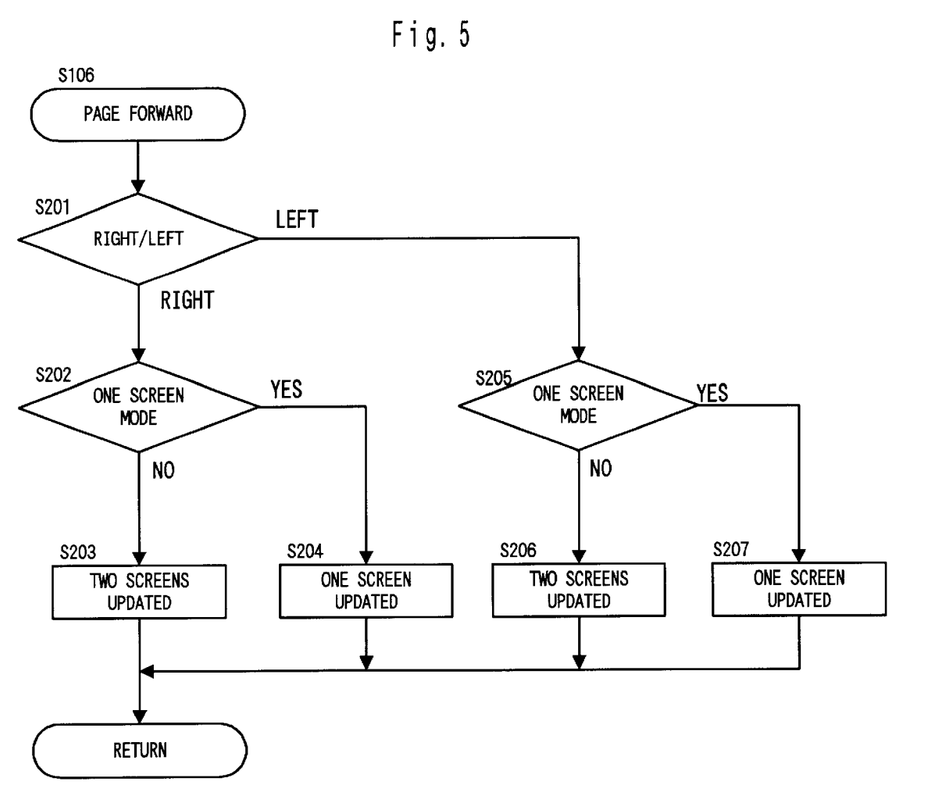
FIG. 5 is a flow chart showing a page forward subroutine in the first embodiment.

FIG. 5 shows the page forwarding subroutine of step S106. Here, first it is determined in step S201 whether the page forward button 13 or 14 was turned ON. Depending on the result of this determination, the currently active screen mode is checked in step S202 or S205. If the active mode is two-screen mode, image data for two pages is read in step S203 or S206 and the screens 11 and 12 are simultaneously updated. If the mode is one-screen mode, image data is read for one page in step S204 or 207 and only the screen 11 is updated. In one-screen mode, the screen 12 is maintained in an OFF state.

It is also acceptable to construct the electronic book such that if the page forward button 13 or 14 is continuously pressed, the page number is increased or decreased continuously and the screen is updated to display the image for the page number present when the button is turned OFF.

Figure 6:
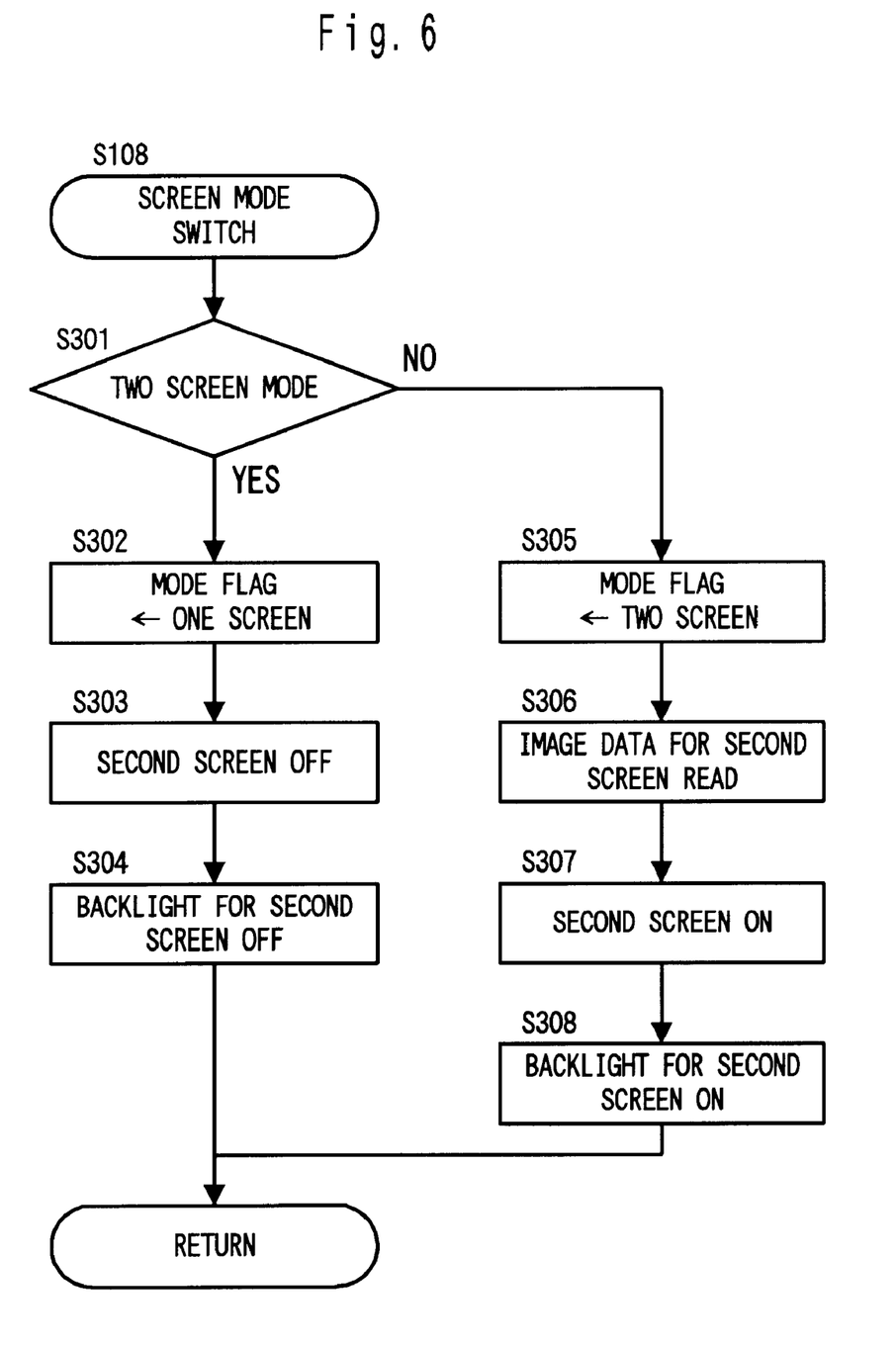
FIG. 6 is a flow chart showing a screen mode switching subroutine for the first embodiment.

FIG. 6 shows the screen mode switching subroutine of step S108. When the screen selection button 15 is pressed, the CPU 21 enters this subroutine. First, in step S301, the active screen mode is checked. If it is two-screen mode, the mode flag is set to one-screen mode in step S302. The second screen 12 is then turned OFF in step S303, and the backlight 35 for the second screen is also turned OFF in step S304.

On the other hand, if the active mode is one-screen mode (NO in step S301), the mode flag is set to two-screen mode in step S305, and the image data for the second screen is read in step S306. The second screen 12 is turned ON in step S307, and backlight 35 for the second screen is also turned ON in step S308.

In the first embodiment, the power supply to the frame memory 31 for the second screen is turned OFF in one-screen mode, and therefore it is necessary to read the data for the second screen when the mode is switched to two-screen mode (see step S306). When this occurs, if the image comprises vertically written characters, the image for the page preceding the page on the first screen 11 is read, and if the image comprises horizontally written characters, the image for the page following that page is read. Incidentally, if the construction is such that power supply continues to the frame memory 31 for the second screen even in one-screen mode, re-reading of the image data is not necessary, enabling display to quickly appear on the second screen 12 when the mode is changed to two-screen mode.

The second embodiment is identical to the first embodiment with regard to the configuration, control circuits, etc., of the electronic book. Consequently, FIGS. 1 through 3 should be referred to where the construction is concerned and only the different control processes (main routine) will be explained.

Figure 7:
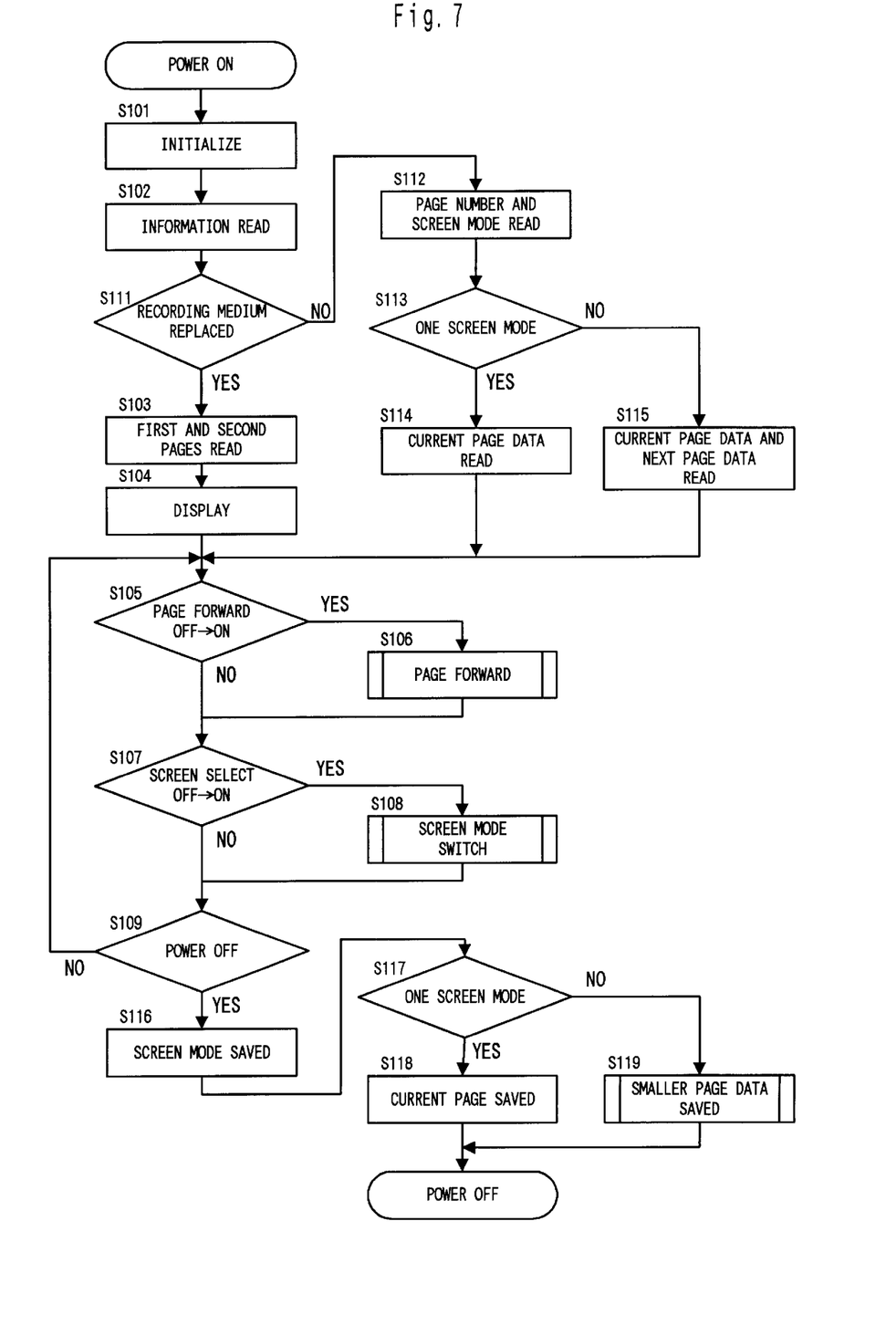
FIG. 7 is a flow chart showing a main routine for a second embodiment.

In the main routine shown in FIG. 7, steps S101 through S109 are identical to those in the main routine shown in FIG. 4, while steps S111 through S119 are newly added processes.

In the second embodiment, after the information stored in the recording medium 5 is read in step S102, it is checked in step S111 whether the recording medium 5 has been replaced. In this second embodiment, the CPU 21 accesses the medium identification information included in the recording medium 5 to check whether or not the recording medium being mounted is the same recording medium mounted the last time the power was turned OFF.

If the recording medium 5 has not been replaced, the display state that was active the last time the power was turned OFF is reproduced. In other words, the page number (s) displayed and the screen mode specified in the previous session are read in step S112 and the screen mode is checked in step S113. If the active screen mode is one-screen mode, the image data for the current page is read in step S114 and displayed on the first screen 11. If it is two-screen mode, the image data for the current page and the next page is read in step S115 and displayed on the first and second screens 11 and 12.

When power OFF is instructed in step S109, the currently specified screen mode is saved in step S116. The screen mode is then checked in step S117. If it is one-screen mode, the image data for the current page is saved in step S118. On the other hand, if it is two-screen mode, the image data for the page having the smaller of the two page numbers is saved in step S119. The image data read in the previous steps S114 and S115 is the data saved in steps S118 and S119.

In the third and fourth embodiments described below, not only the first screen 11 but also the second screen 12 can be selected to display information for one page. However, where display using the first screen 11 only is changed to display using the second screen 12 only in one-screen mode, the issue arises regarding how to handle the contents to display on the second screen 12. In other words, if the page adjacent to the page being displayed on the first screen 11 is displayed on the second screen 12, the user will not recognize the relationship between the contents newly displayed on the second screen 12 and the page that was displayed on the first screen 11, thus the user will likely become confused. In order to prevent such confusion, in the third embodiment, when display using the first screen 11 only is changed to display using the second screen 12, the two-screen mode is activated during transition.

Figure 8:
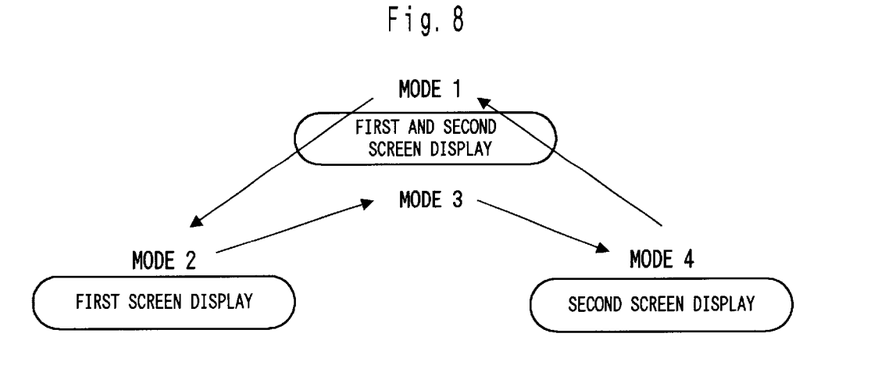
FIG. 8 show how screen mode switching is performed in a third embodiment.

In other words, in the third embodiment, as shown in FIG. 8, the screen modes 1, 2, 3 and 4 are sequentially selected in that order. In mode 1, the first and second screens 11 and 12 are displayed. In mode 2, only the first screen 11 is displayed. In mode 3, the first and second screens 11 and 12 are displayed in the same manner as in mode 1. In mode 4, only the second screen 12 is displayed. The configuration, control circuit, etc. of the electronic book are identical to those in the first embodiment. Therefore, FIGS. 1, 2 and 3 should be referred to regarding the construction, and only the different control process (screen mode switching process) will be explained.

Figure 9:
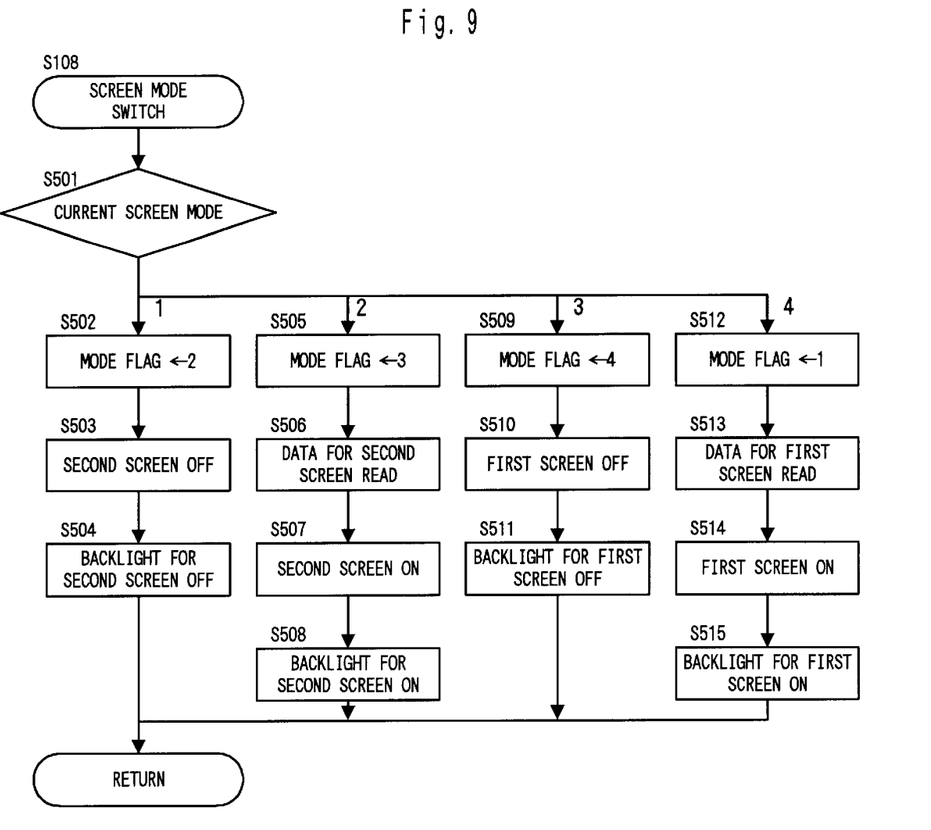
FIG. 9 is a flow chart showing a screen mode switching subroutine for the third embodiment.

In the screen mode switching subroutine shown in FIG. 9, the current screen mode is checked in step S501. There are four screen modes, as described above. If mode 1 is specified, the mode flag is set to '2' in step S502. The second screen 12 is turned OFF in step S503, and the backlight 35 for the second screen is also turned OFF in step S504. If mode 2 is specified, the mode flag is set to '3' in step S505. The data to be displayed on the second screen is then read in S506. The second screen 12 is turned ON in step S507. The backlight 35 for the second screen is turned ON in step S508.

If mode 3 is specified, the mode flag is set to '4' in step S509. The first screen 11 is then turned OFF in step S510, and the backlight 35 for the first screen is also turned OFF in step S511. If mode 4 is specified, the mode flag is set to '1' in step S512. The data for the first screen is then read in step S513. The first screen 11 is turned ON in step S514, and the backlight 35 for the first screen is also turned ON in step S515.

Figure 10:
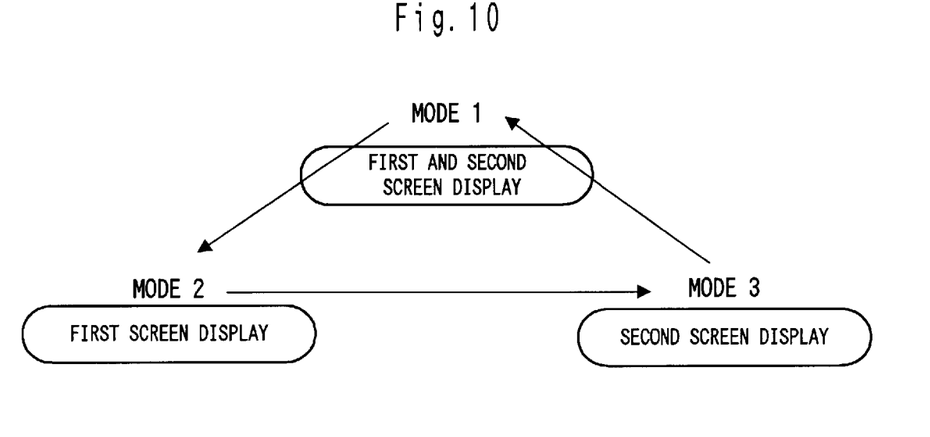
FIG. 10 show how screen mode switching is performed in a fourth embodiment.

In the fourth embodiment, when display using the first screen 11 only is changed to display using the second screen 12 only, the contents displayed on the first screen 11 are transferred to the second screen 12 in order to prevent confusion on the part of the user. In this embodiment, as shown in FIG. 10, the modes 1, 2 or 3 are sequentially selected, in that order. In mode 1, the first and second screens 11 and 12 are displayed. In mode 2, only the first screen 11 is displayed. In mode 3, only the second screen 12 is displayed. The configuration, control circuit, etc. of the electronic book are identical to those in the first embodiment. Therefore, FIGS. 1, 2 and 3 should be referred to as far as the construction is concerned, and only the different control process (screen mode switching) will be explained.

Figure 11:
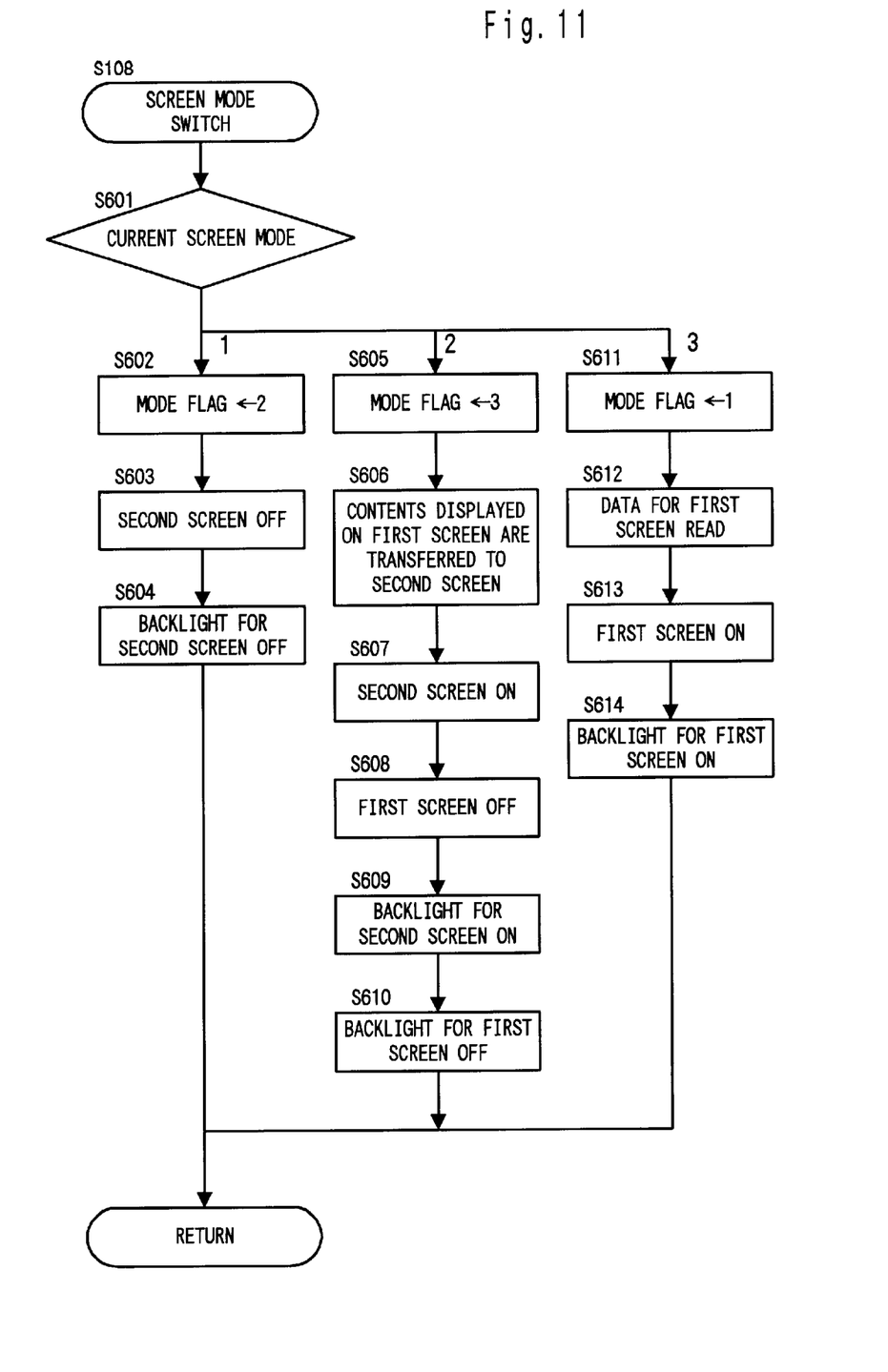
FIG. 11 is a flow chart showing a screen mode switching subroutine for the fourth embodiment.

In the screen mode switching subroutine shown in FIG. 11, the current screen mode is checked in step S601. There are three screen modes, as described above. If mode 1 is specified, the mode flag is set to '2' in step S602. The second screen 12 is turned OFF in step S603, and the backlight 35 for the second screen is also turned OFF in step S604. If mode 2 is specified, the mode flag is set to '3' in step S605, and the contents displayed on the first screen 11 are transferred to the second screen 12 in step S606. When the second screen 12 is turned ON in step S607, the first screen 11 is turned OFF in step S608. Further, when the backlight 35 for the second screen is turned ON in step S609, the backlight 35 for the first screen is turned OFF in step S610.

If mode 3 is specified, the mode flag is set to '1' in step S611. The data for the first screen is then read in step S612. The first screen 11 is turned ON in step S613, and the backlight 35 for the first screen is also turned ON in step S614.

In the fourth embodiment, if the screen mode is repeatedly changed, page information is alternately sent to the screen 11 or screen 12 and displayed.

Figure 12:
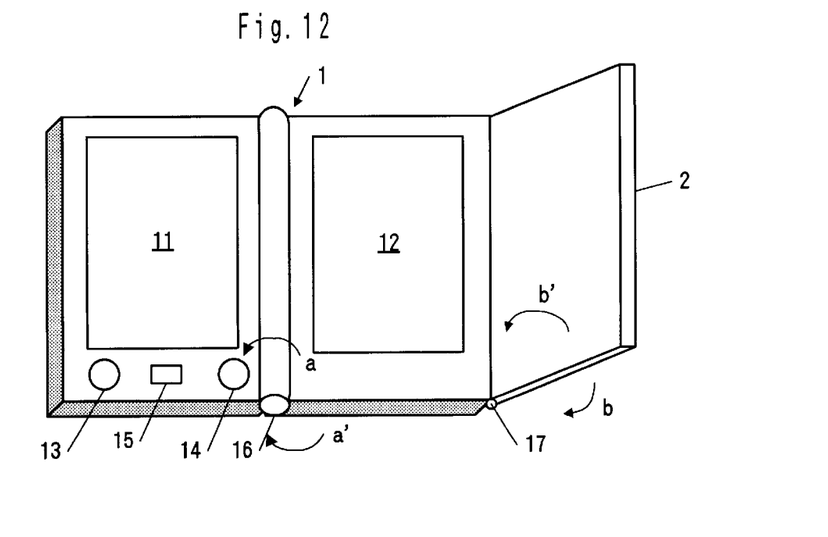
FIG. 12 is a perspective view showing a first modified version of the electronic book.

FIG. 12 shows a first modified version of the electronic book in which the external view of the device is different. Where display is performed only in the first screen 11 when the one-screen mode is present, as in the first embodiment, it is preferred that the operation members be concentrated around the first screen 11, as shown in FIG. 12. It is preferred that at least the page forward buttons 13 and 14 and the screen selection button 15, which are used while the screen is being viewed, be located on the side of the first screen 11.

Figure 13:
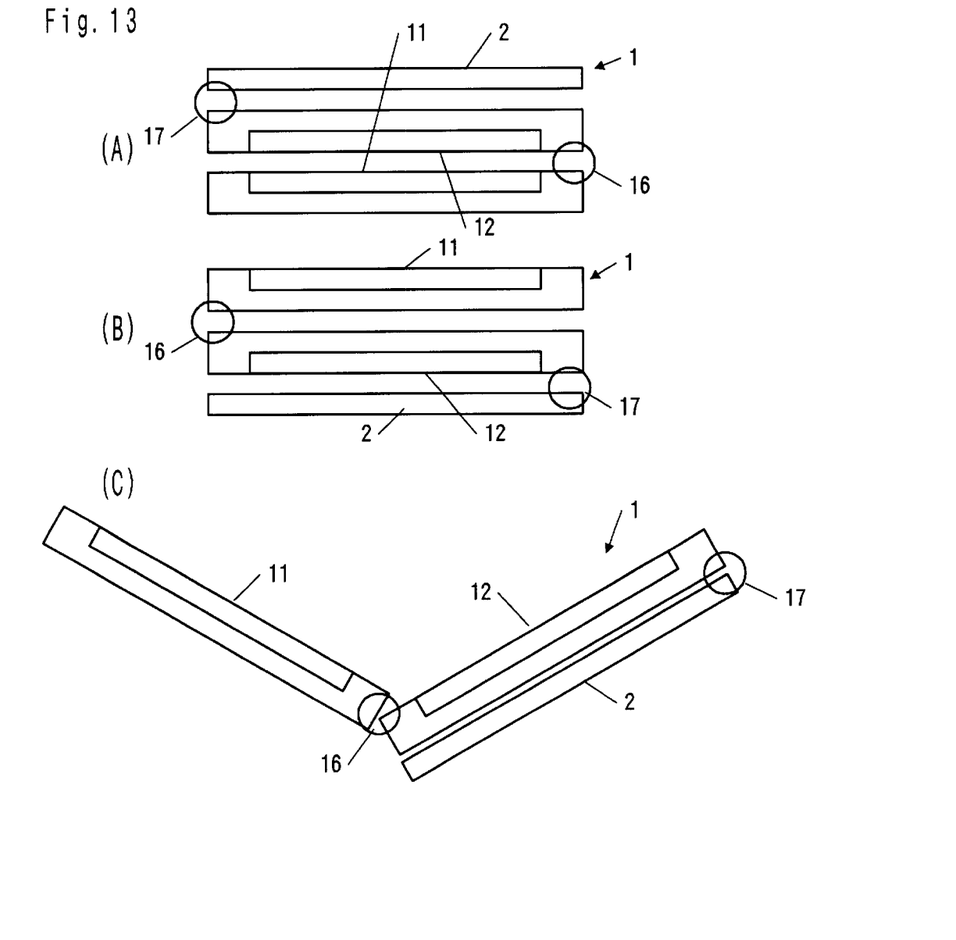
FIG. 13 is a drawing to explain the first modified version when in a folded state.

Further, in this first modified version, in addition to the support shaft 16 that movably joins the first screen 11 and the second screen 12, a cover 2 is mounted to the second screen 12 by means of a support shaft 17. When storing the electronic book, the second screen 12 is moved in the direction of the arrow (a) so that the screens 11 and 12 are closed together, and the cover 2 is moved in the direction of the arrow (b) so that it comes to be positioned at the back of the second screen 12 (see FIG. 13(A)). In one-screen mode in which an image is displayed on the first screen 11 only, if the second screen 12 is moved in the direction of the arrow (a') and the cover 2 is folded over in the direction of the arrow (b'), the image may be viewed even while the electronic book is in a compact state (see FIG. 13(B)). In particular, by positioning the cover 2 on the surface of the second screen 12, the second screen 12 is prevented from receiving unnecessary pressure or becoming damaged. In two-screen mode in which an image is displayed on the screens 11 and 12, only the cover 2 is folded over in the direction of the arrow (b) (see FIG. 13(C)).

Figure 14:
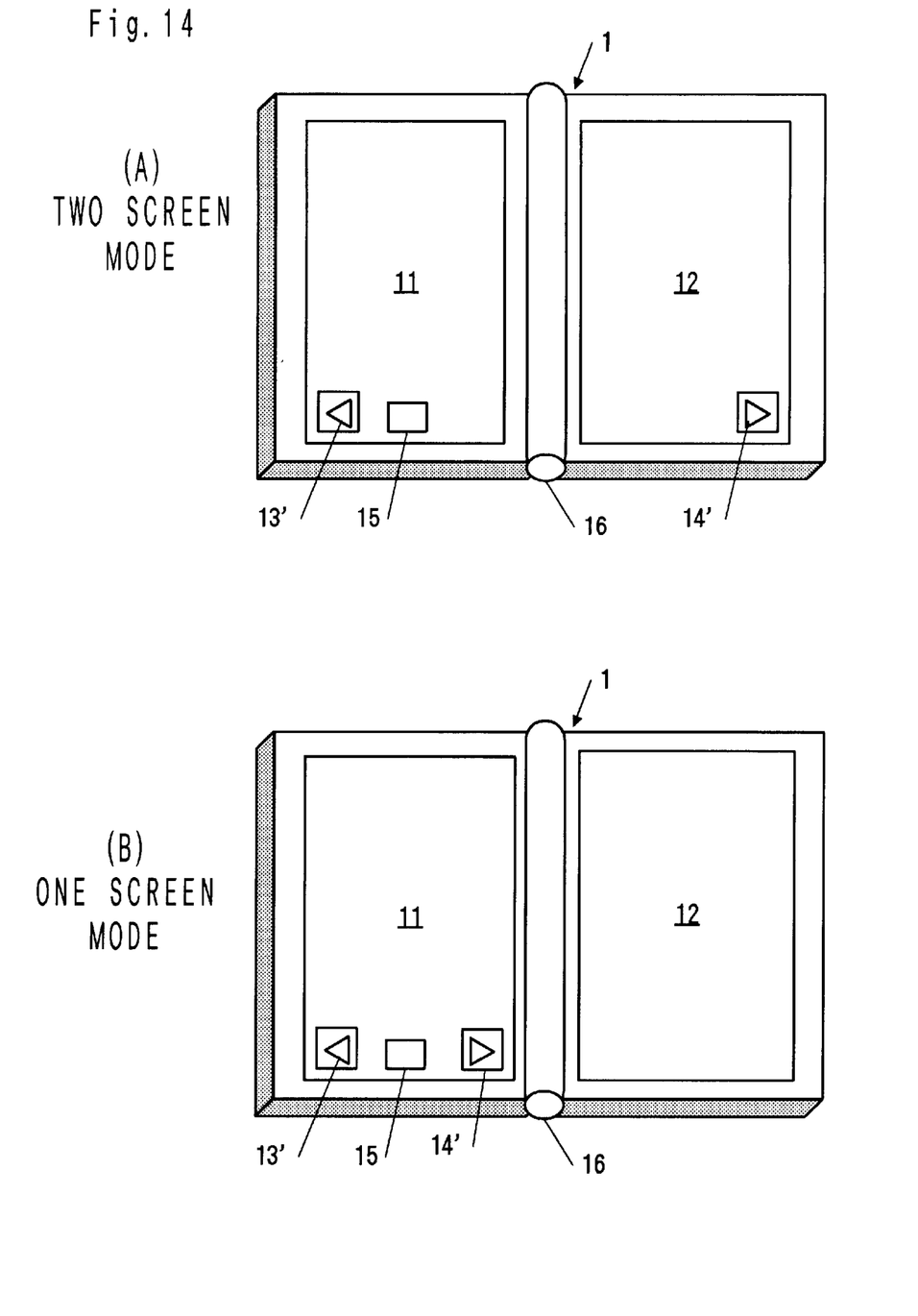
FIG. 14 is a perspective view showing a second modified version of the electronic book.

FIG. 14 shows a second modification of the electronic book in which the external view of the device is different. In the electronic book 1 comprising the second modified version, a clear touch panel is mounted on the surfaces of the screens 11 and 12, and the page forward buttons 13' and 14' and the screen selection button 15' are displayed on the screens 11 and 12, respectively, via the touch panel (see FIG. 14(A)). In one-screen mode in which an image is displayed on the first screen 11 only, these operation members are displayed on the first screen 11 only (see FIG. 14(B)).

The electronic book pertaining to the present invention is not limited to these embodiments, and may naturally be varied within its essential scope.

In particular, the electronic book may have any external view. In the previous embodiments, the user manually alternates between the one-screen mode and the two-screen mode. However, it is acceptable if the mode is automatically switched to the one-screen mode if the amount of power remaining in the power supply has become small. Further, it is also acceptable if the image is reduced such that images for two pages are displayed on one screen when the one-screen mode is activated.

As described above, the electronic book of the present invention is equipped with a first screen and a second screen, and allows the user to see the contents while forwarding the pages as if reading a regular book. Meanwhile, a one-screen mode in which the contents are displayed in only the first or second screen may be selected. When the one-screen mode is present, the drive of one screen is stopped or the illumination for that screen is turned OFF. Consequently, power consumption is reduced, enabling the electronic book, which is driven using a battery so that it may be made portable, to reproduce information over a long period of time.

In the above embodiment, an electronic book is shown as an example, however, but may be applied to any battery-driven (portable) electronic device such as a PC (personal computer), PDA (Personal Digital Assistance).

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

It is claimed:

1. An image information display device comprising:
    a first display to display an image;
    a second display to display an image;
    a selector that is adapted to select between at least a first mode of operation and a second mode of operation; and
    a controller, coupled to the selector, the first display, and the second display, to control a display of images in the first display and the second display in accordance with a selected mode of operation,
    wherein in the first mode of operation, image information including one page of a plurality of pages is displayed on one of the first display and the second display and subsequent pages of said image information selected by the user are displayed on said one of the first display and the second display, and in the second mode of operation, image information is displayed on both the first display and the second display.

2. An image information display device in accordance with claim 1, wherein the first display is movably joined to the second display, and when in an open state, the first display and the second display are adjacent and concurrently observable.

3. An image information display device in accordance with claim 2, wherein in a fully closed state, at least one of the first display and the second display is readily observable.

4. An image information display device in accordance with claim 2, further comprising a cover member, movably coupled to one of the first display and the second display, to selectively cover at least one of the first display and the second display.

5. An image information display device in accordance with claim 1, wherein in the first mode of operation, the controller disables one of the first display and the second display.

6. An image information display device in accordance with claim 5, wherein the controller disables one of the first display and the second display through at least extinguishing a means of illumination for the one of the first display and the second display.

7. An image information display device in accordance with claim 1, wherein the selector is further adapted to select a third mode of operation, and
    wherein in the third mode of operation, image information is displayed on one of the first display and the second display not otherwise utilized for the first mode of operation.

8. An image information display device in accordance with claim 1, wherein the image information display device is an electronic book.

9. An image information display device comprising:
    a first display;
    a second display;
    a selector that is adapted to select between at least a first display mode and a second display mode; and
    a controller, coupled to the selector, the first display, and the second display, to control a display of images in the first display and the second display in accordance with a selected display mode,
    wherein in the first display mode, image information including one page of a plurality of pages is displayed in one of the first display and the second display and subsequent pages of said image information selected by the user are displayed on said one of the first display and the second display, and in the second display mode, image information is displayed in both the first display and the second display, and
    wherein in the first display mode, the controller disables operations of one of the first display and the second display.

10. An image information display device in accordance with claim 9, wherein the image information display device is an electronic book.

11. A method of displaying image information using an electronic device having a plurality of displays to selectively display images, wherein the electronic device can function in at least two display modes: a first display mode in which image information is presented using at least one display and a second display mode in which image information is presented using a number of displays greater than that utilized for display operations in the first display mode, the steps comprising:

identifying a display mode of the electronic device;

controlling a presentation of image information, the image information being formed from a plurality of units, including stepping through at least individual units of the plurality of units in either a forward direction or a rearward direction relative to the plurality of units; and displaying at least a portion of image information on at least one display in accordance with an identified display mode and in a manner responsive to the step of controlling.

12. A method in accordance with claim 11, wherein in the first display mode, image information is displayed on one display, and in the second display mode, image information is displayed on two displays.

13. A method in accordance with claim 11, wherein the electronic device can function in at least a third display mode, and wherein in the third display mode, image information is displayed on one display, and the one display of the third display mode is different than the one display of the first display mode.

14. A method in accordance with claim 13, further comprising the step of selecting a display mode, wherein to facilitate the step of selecting a display mode, display modes can repeatably cycle among the first display mode, the second display mode, and the third display mode.

15. A method in accordance with claim 13, further comprising the step of selecting a display mode, wherein to facilitate the step of selecting a display mode, display modes can repeatably cycle among the first display mode, the second display mode, and the third display mode.

16. A method in accordance with claim 12, wherein in the second display mode, image information displayed on the two displays is related but dissimilar.

17. A method in accordance with claim 12, wherein when in the first display mode, the step of displaying includes updating only one display during stepping through the image information in either the forward direction or the rearward direction.

18. A method in accordance with claim 12, wherein when in the second display mode, the step of displaying includes updating both displays during stepping through the image information in either the forward direction or the rearward direction.

19. A method in accordance with claim 11, further comprising the step of setting a display mode.

20. A method in accordance with claim 19, wherein when the electronic device is in a display mode other than the first display mode and the step of setting a display mode effects a setting of the first display mode, the step of controlling further includes terminating driving of displays not supported by the first display mode.

21. A method in accordance with claim 19, wherein when the electronic device is in a display mode other than the first display mode and the step of setting a display mode sets the first display mode, the step of controlling further includes disabling means of illumination for displays not supported by the first display mode.

22. A method of displaying image information using an electronic device adapted to receive removable storage medium and having a plurality of displays to selectively display images, wherein the electronic device can function in at least two display modes: a first display mode in which image information is presented using at least one display and a second display mode in which image information is presented using a number of displays greater than that utilized for display operations in the first display mode, the steps comprising:

detecting an identity of a received removable storage medium;

identifying a display mode of the electronic device;

controlling a presentation of image information for purposes of displaying the image information by the plurality of displays; and in accordance with a detected identity of a received removable storage medium, displaying at least a portion of image information on at least one display in accordance with an identified display mode and in a manner responsive to the step of controlling.

23. An image information display device comprising:

a first display to display an image;

a second display to display an image;

a selector that is adapted to select between at least a first mode of operation and a second mode of operation;

an image controller, coupled to the first display and the second display, to supply image data to the first display and the second display;

a display controller, coupled to a power source, the first display, the second display, and the image controller, wherein in the first mode of operation, image information including one page of a plurality of pages is displayed on one of the first display and the second display and subsequent pages of said image information selected by the user are displayed on said one of the first display and the second display, and in the second mode of operation, image information is displayed on both the first display and the second display, and wherein in the first mode of operation, the display controller is adapted to effect at least one of the following functions: (i) inhibit a supply of image data to one of the first display and the second display and (ii) interrupt a supply of power from the power source to the one of the first display and the second display.

24. An image information display device in accordance with claim 23, wherein the image information display device is an electronic book.

25. An image information display device comprising:

a first display to display an image;

a second display to display an image; and a controller to operatively and to selectively deliver image information to at least one of the first display and the second display, wherein the first display is movably coupled to the second display, and when in an open state, the first display and the second display are adjacent and concurrently observable, and wherein in a fully closed state, at least one of the first display and the second display is readily observable.

26. An image information display device in accordance with claim 25, wherein the image information display device is an electronic book.

27. An image information display device in accordance with claim 25, further comprising a cover member, movably coupled to one of the first display and the second display, to selectively cover at least one of the first display and the second display otherwise readily observable in the fully closed state.

28. An image information display device in accordance with claim 25, wherein the characteristic of the first display is similar to that of the second display.

29. A method of displaying image information using an electronic book having a first display and a second display, wherein the electronic book can function in at least a first mode and a second mode, the steps comprising:

selecting a display mode;

controlling a supply of image information for purposes of displaying the image information using at least one of the first display and the second display based on a selected display mode; and displaying at least a portion of image information on at least one display in accordance with the selected display mode and in a manner responsive to the step of controlling, wherein without regard to specific image information being displayed, presentation of image information in the first mode consumes less power than presentation of image information in the second mode.

* * * * *